United States Patent [19]

Reade

[11] Patent Number: 4,773,190
[45] Date of Patent: Sep. 27, 1988

[54] DOUBLE-GLAZING ASSEMBLIES

[75] Inventor: Grahame M. Reade, Wheathampstead, England

[73] Assignee: Imperial Chemical Industries PLC, Hertfordshire, England

[21] Appl. No.: 415,426

[22] Filed: Sep. 7, 1982

Related U.S. Application Data

[63] Continuation of Ser. No. 99,751, Dec. 3, 1979, abandoned, which is a continuation-in-part of Ser. No. 31,601, Apr. 19, 1979, abandoned.

[30] Foreign Application Priority Data

Dec. 21, 1978 [GB] United Kingdom ............... 49612/78
Mar. 2, 1979 [GB] United Kingdom ............... 7907389

[51] Int. Cl.⁴ .............................................. E06B 3/26
[52] U.S. Cl. ............................................ 52/2; 52/741
[58] Field of Search ................... 52/81, 172, 171, 2, 52/202, 741

[56] References Cited

U.S. PATENT DOCUMENTS

| | | | |
|---|---|---|---|
| 2,062,747 | 12/1936 | Gelstharp | 52/172 |
| 3,001,300 | 9/1961 | Green | 52/171 |
| 3,249,682 | 5/1966 | Laing | 52/2 |
| 3,664,069 | 5/1972 | Ikai | 52/2 |
| 3,841,039 | 10/1974 | Farnsworth | 52/81 |
| 4,093,352 | 6/1978 | Pisar | 52/171 |
| 4,114,325 | 9/1978 | Hochstein | 52/2 |

FOREIGN PATENT DOCUMENTS

| | | | |
|---|---|---|---|
| 1379026 | 12/1964 | France | 52/2 |
| 2389751 | 1/1978 | France. | |
| 2131873 | 1/1972 | Fed. Rep. of Germany | 52/2 |
| 1145060 | 3/1969 | United Kingdom. | |
| 1506291 | 4/1978 | United Kingdom. | |

OTHER PUBLICATIONS 2,115,775, Nov. 1971, German Specification J. M. L.
2,162,389, Jun. 1973, German Specification F. K.
2,503,344, Jul. 1976, German Specification.

*Primary Examiner*—John E. Murtagh
*Attorney, Agent, or Firm*—Cushman, Darby & Cushman

[57] ABSTRACT

A double-glazing assembly suitable for horticultural and agricultural growing houses comprises two flexible light-transmitting thermoplastics film, especially polyethylene terephthalate films, separated by a spacing framework. Means are provided to evacuate the enclosure between the sheets during the day-time thereby improving the light transmission of the assembly. The assembly is also preferably provided with means for inflation to optimise the conservation of thermal energy during the night-time.

7 Claims, 3 Drawing Sheets

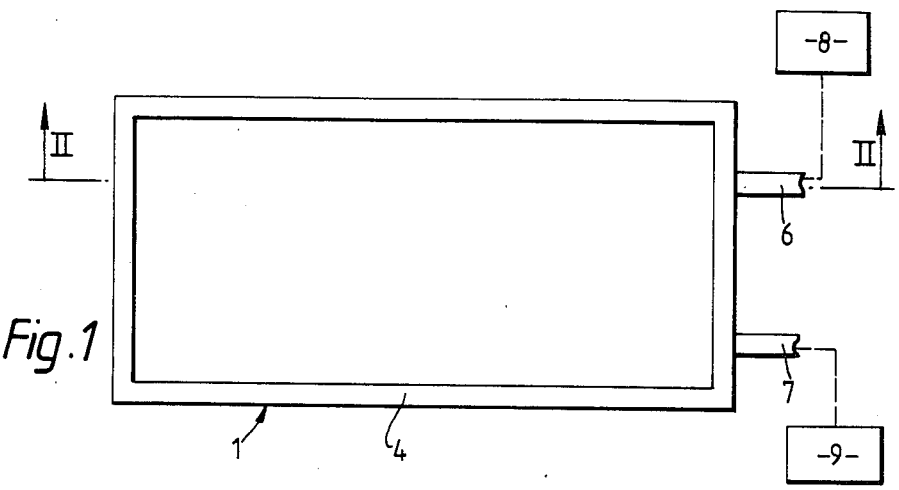
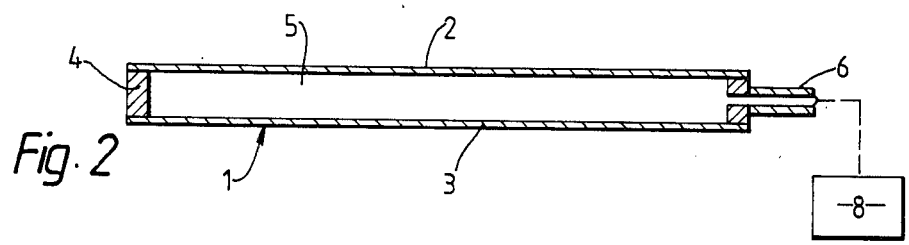
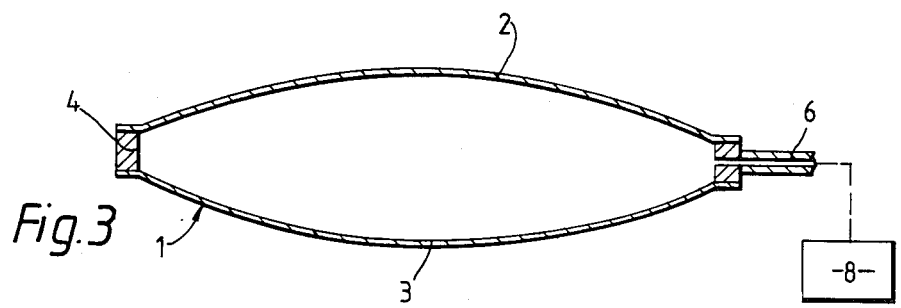
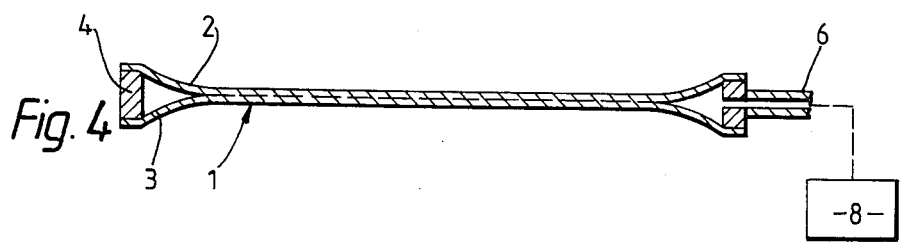

DOUBLE-GLAZING ASSEMBLIES

This is a continuation of application Ser. No. 99,751 filed Dec. 3, 1979 (now abandoned) as a continuation-in-part of application Ser. No. 31,601 filed Apr. 19, 1979 (now abandoned).

The present invention relates to double-glazing assemblies.

It is known to reduce the transmission of thermal energy between adjacent spaces having a temperature differential by interposing a double-glazing assembly having thermal insulation properties. French patent specification No. 2 315 844 describes a plant-growing house comprising a light-transmitting double-glazing assembly formed from an inflated envelope of a plastics film. Whilst such assemblies provide satisfactory thermal insulation for horticultural and agricultural purposes, it has been found that the double thickness of film adversely affects the transmission of solar light because incident light is scattered at each of the four surfaces of the films. This reduction in light transmission retards the photosynthesis in plant life. When the duration and intensity of the solar light is poor the resulting reduction in plant growth partially or completely eliminates the economic benefits for commercial growers which can be achieved by conserving energy with double glazing.

The present invention relates to a double-glazing assembly suitable for use in horticultural and agricultural growing houses which is capable of providing adequate thermal insulation during the night-time and adequate light transmission during the day-time. Although this invention is described herein in relation to horticultural and agricultural growing houses it is to be understood that the double-glazing assemblies may be employed in other structures.

According to the present invention a double-glazing assembly comprises a panel comprising two sheets of a flexible light-transmitting thermoplastics film separated in spaced-apart relationship by a framework, said sheets of film and said framework defining a substantially gas impermeable enclosure except that said enclosure is connected to a means arranged to evacuate the enclosure.

The means for evacuating the enclosure preferably comprise a vacuum pump such that the fluid in the enclosure, usually air, can be partially or completely eliminated from the enclosure.

The enclosure is preferably capable of being evacuated so that the inner surfaces of the sheets of film are united in intimate surface-to-surface contact thereby effectively forming a single film thickness over the regions of contact. As a result the united film surfaces are brought into optical contact thereby partially or completely eliminating the scattering of light at their interface. Accordingly, the double-glazing assembly may be evacuated during the day-time when it is primarily important to optimise solar light transmission for promoting plant growth in the growing house and the conservation of thermal energy is less important.

Evacuating the enclosure of the double-glazing panel increases the structural rigidity of the panel by virtue of the internal tensions imposed upon the sheets as a result of the evacuation. Accordingly, the panel may be provided with a simple light-weight framework such as an extruded profile of a thermoplastics material, e.g. a vinyl chloride polymer or copolymer or an olefine polymer or copolymer, or a metal structure such as an aluminium profile. The overall weight of such a panel is generally less than that of a typical glass pane of comparable area with the result that the supporting structure for the growing house may be of lighter construction thus providing economic benefits. Furthermore, it is possible to employ double-glazing panels which are larger in area than the typical glass panes conventionally employed in growing houses thereby reducing the number of structural supports and glazing bars so that the amount of light absorbed by the structural supports may be reduced.

The framework of the panel maintains the sheets of film in a spaced-apart relationship, unless the enclosure has been evacuated. This spacing serves as a thermal insulant and may result in an adequate conservation of thermal energy in some geographical regions. However, improved thermal insulation can be achieved by increasing the spacing between the sheets of film by inflating the enclosure. Inflation of the enclosure also serves to increase the structural rigidity of the panel by the internal tensions established in the sheets as a result of inflation.

Therefore, in a preferred embodiment of the invention the enclosure of the panel is also connected to a means arranged to inflate the enclosure.

Inflating the panel causes the sheets of flexible film to bow outwardly. The amount by which the spacing between the sheets of film may increase is greater at the centre of large panels than small panels and may be controlled by providing means to limit the deflection of the sheets of film during inflation, for example, by rivetting or bonding the sheets together at selected points over the area of the panel.

The inflation of the enclosure may be accomplished by means of a source of pressurised gas. Air is the most convenient and hence the preferred inflating gas and may be supplied under pressure to the enclosure by means of a pump. The inflating gas may alternatively be supplied from a pressurised source of gas such as a pressurised gas storage cylinder. Suitable gases for supply in this manner are nitrogen and carbon dioxide.

The optimum conservation of thermal energy in a growing house is generally required during the night-time when of course the light-scattering properties of the panel have no substantial effect. Accordingly, a double-glazing assembly according to the invention is generally inflated at night-time in order to conserve thermal energy and is evacuated during the day-time as described above to optimise light transmission. Nevertheless, beneficial economic savings resulting from energy conservation would justify inflating the double-glazing assembly during the day-time whenever the climatic temperature is exceedingly low and significantly lower than the growing temperature maintained in the growing house, especially when the intensity of solar light is high.

The connections to the evacuating means and the inflating means, when present in the structure, are preferably effected through the framework of the panel.

A growing house may be constructed from a multiplicity of double glazing panels having the structure according to the invention described above. The double-glazing panels may be supported by a lattice of glazing bars which may, for example, be produced from an extruded metal, e.g. aluminium or thermoplastics profile. The structure of double-glazing panels and glazing bars may be further supported by a load-bearing support which may, for example, be produced as an assembly of interconnected steel profiles.

Some or all of the glazing bars of such a structure preferably incorporate a conduit by which the panel of the double-glazing assembly may be connected, preferably via the framework of the assembly, to the evacuating means and, if present, the inflating means. This may be conveniently accomplished by forming the glazing bars as hollow extruded profiles, e.g. aluminium profiles, provided with suitable interconnections to the double-glazing panels and the evacuating and optional inflating means. It will be appreciated that it is not necessary for all of the glazing bars to include such a conduit and that provided each of the double-glazing panels is connected to a conduit for evacuation, and optionally inflation, some of the glazing bars may be formed, if desired, as simple non-hollow profiles.

Therefore, in one embodiment of the invention a double-glazing assembly comprises at least one panel, as defined above, associated with a glazing bar having a conduit connecting the enclosure of the panel to an evacuating means and preferably also to an inflating means.

Preferably separate sections of the glazing area comprising a plurality of the double-glazing panels are connected to independent evacuating means and likewise, if included in the construction, to independent inflating means so that a defect in one section, e.g. a failure in the associated evacuating means, will not affect the rigidity of the other sections and hence the structural integrity of the whole growing house.

In another embodiment of the invention, pumps are employed for evacuating and inflating the enclosure of the double-glazing panel and the evacuating or inflating pump as appropriate is maintained in continuous operation throughout the period of time when it is desired to evacuate or inflate the enclosure.

The flexible light-transmitting thermoplastics film may be formed from any suitable thermoplastics material such as polymers and copolymers of styrene, polyamides, polymers and copolymers of vinyl chloride, polyvinyl fluoride, polyvinylidene fluoride, polycarbonate, polymers and copolymers of olefines, e.g. polyethylene and polypropylene, polysulphones and linear polyesters which may be obtained by condensing one or more dicarboxylic acids or their lower alkyl diesters, e.g. terephthalic acid, isophthalic, phthalic, 2,5-, 2,6- and 2,7-naphthalene dicarboxylic acid, succinic acid, sebacic acid, adipic acid, azelaic acid, diphenyl dicarboxylic acid, and hexahydroterephthalic acid or bis-p-carboxyl phenoxy ethane, optionally with a monocarboxylic acid, such as pivalic acid, with one or more glycols, e.g. ethylene glycol, 1,3-propanediol, 1,4-butanediol, neopentyl glycol and 1,4-cyclohexanedimethanol.

The preferred films are transparent although it is possible to use films having a slight degree of opacity in order to diffuse the light passing through the panel. For example, a transparent film may be used as the external sheet and a slightly opaque film as the internal sheet.

Linear polyester films, and especially biaxially oriented and heat-set films of polyethylene terephthalate, are particularly suitable for the formation of the double-glazing panel and may be employed in thicknesses of at least 12 $\mu$m. Greater thicknesses provide better durability and resistance to accidental puncturing and the sheets of film may be of different thicknesses to provide the most satisfactory combination of properties. Polyethylene terephthalate films of thickness about 125 $\mu$m may be used as the external and/or internal sheets. When films of different thicknesses are used, the external sheet may have a thickness of about 125 $\mu$m and the internal sheet about 12 $\mu$m.

The optical performance of the inner contacting surfaces of the sheets of film may, if desired, be improved by treating or coating the film surfaces to reduce the reflection or scattering of light at the surfaces. This may, for example, be achieved by interposing a liquid between the contacting surfaces, e.g. in the case of the preferred polyester films by coating the inner surfaces with a thin layer of glycerine or a silicone oil. A layer of water is also effective and will normally be present in a panel comprising sheets of polyester film as a result of moisture which permeates through the film from the humid environment of the growing house and/or moisture which may be introduced when the panel is inflated condensing upon the film surfaces, or may be intentionally introduced into the panel. Alternatively, the film surfaces may be roughened or embossed, or coated with a resinous material which has a high transmission of light together with a low tendency to scatter or reflect light, e.g. gelatin. The materials used for treating or coating the film surfaces in order to counter light scattering or reflection preferably have a refractive index in the region of the refractive indices of air and the polyester film and most preferably between their refractive indices.

The inner surfaces of the sheets of film and optionally of the framework may be sterilised to inhibit the growth of mould, e.g. by treatment with ethylene oxide.

Many thermoplastics materials tend to degrade and embrittle when exposed to ultra-violet light for prolonged periods of time. It is therefore preferred that at least the external sheet of film, when the panel is installed in a growing house, but most preferably both sheets should be stabilised against such degradation, e.g. by the inclusion of suitable ultra-violet light absorbing compounds in the thermoplastic material or by subjecting the film to a suitable stabilising treatment.

In certain geographical regions when prolonged and intense solar radiation might introduce a surfeit of thermal energy and light radiation the double-glazing structure may be arranged to control the intensity of solar radiation transmitted into the growing house. Accordingly, a shutter pattern may be applied to each of the sheets of film. The shutter pattern may comprise a solar radiation absorbing material and may, for example, consist of a set of parallel lines or bands applied to the film surfaces such that the patterns applied to the films are in a staggered relationship to each other when the enclosure is neither inflated nor evacuated. Complete or partial inflation or evacuation of the panel enclosure results in a relative movement of the two sheets of films and hence the shutter patterns applied to them. The degree of inflation or evacuation can be selected to determine the amount of shuttering and hence the absorption of the incident radiation.

An alternative means for controlling the intensity of the transmitted solar radiation is to pass a light absorbing fluid through some or all of the panels in the growing house structure. Photosynthesis occurs at visible light wavelengths less than about 700 nm and therefore it is preferred to use a fluid which absorbs light wavelengths greater than about 700 nm, e.g. an aqueous solution of copper chloride. Alternative light-absorbing fluids include gases such as smoke.

Certain embodiments of the invention are described below with reference to the accompanying drawings in which:

FIG. 1 is a plan view of one double-glazing embodiment according to the invention;

FIG. 2 is a cross-sectional view of the assembly illustrated in FIG. 1 and taken on the line II—II thereof;

FIG. 3 is a cross-sectional view corresponding to FIG. 2 but showing the assembly in the inflated state;

FIG. 4 is a cross-sectional view also corresponding to FIG. 2 but showing the assembly in the evacuated state.

Figure 5:
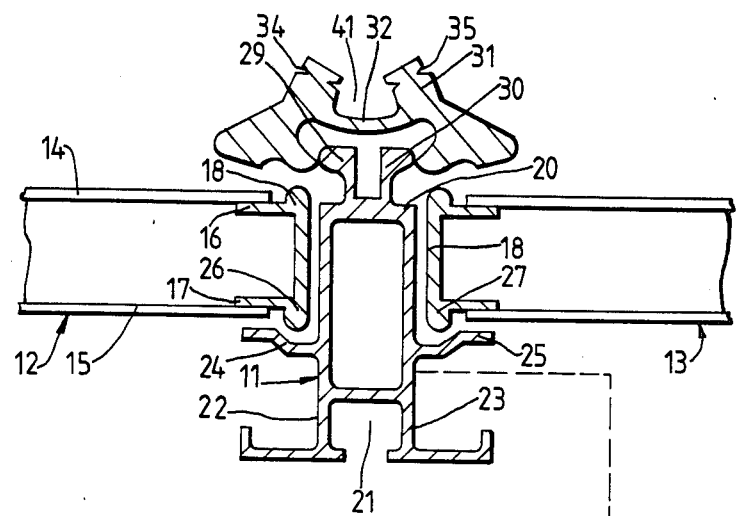
FIG. 5 is a cross-sectional view of the component parts of another embodiment according to the invention.

FIGS. 1 to 4 of the drawing illustrate a double-glazing panel generally indicated by the reference numeral 1. The panel 1 consists of two sheets 2 and 3 of clear transparent biaxially oriented and heat-set polyethylene terepthalate film having a thickness of 125 $\mu$m adhesive bonded to a light-weight rectangular framework 4 formed from an extruded section of polyvinyl chloride bonded together at the corners of the framework 4. The sheets of film 2 and 3 are supported approximately 1 cm apart by the framework 4 which is of corresponding dimensions. The panel is assembled such that the sheets of film 2 and 3 are held in a taut condition as illustrated in FIG. 2 when no inflation or evacuation is applied.

The bonds between the sections of the framework 4 and between the sheets of film 2 and 3 and the framework 4 form a gas impermeable enclosure 5. An outlet duct 6 communicates via the framework 4 with the enclosure 5 and is connected to a vacuum pump 8, shown schematically in the drawing, by which the panel 1 can be evacuated into the condition shown in FIG. 4.

An inlet duct 7 also communicates via the framework 4 with the enclosure 5 and is of similar construction to the outlet duct 6 illustrated in FIGS. 2, 3 and 4. The inlet duct 7 is connected to an air pump 9, shown schematically in FIG. 1, supplying air under pressure by which the panel can be inflated to the condition shown in FIG. 3.

The air pump 9 and vacuum pump 8 are not illustrated in detail in the drawing but are of conventional construction.

A plant growing house may be constructed from a multiplicity of double-glazing panels as illustrated in FIGS. 1 to 4. At night-time when it is desired to conserve thermal energy the panels are inflated to the condition illustrated in FIG. 3 whilst during the day-time the panels are evacuated to the condition illustrated in FIG. 4 to optimise light transmission into the growing house.

Figure 6:
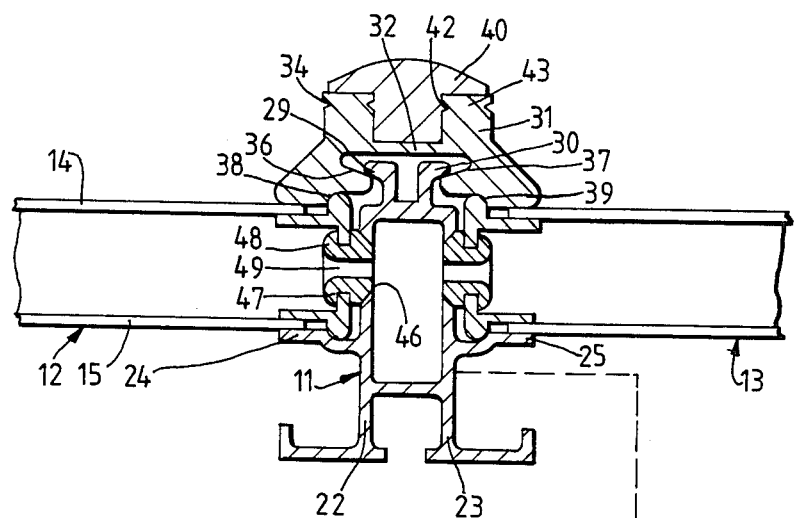
FIG. 6 is a cross-sectional view of the embodiment illustrated in FIG. 5 but showing the component parts in the assembled state.

FIGS. 5 and 6 show a glazing bar 11 supporting an edge of each of two double-glazing panels illustrated partially at 12 and 13. The double-glazing panel 12 consists of two sheets 14 and 15 of clear transparent biaxially oriented and heat-set polyethylene terephthalate film having a thickness of 125 $\mu$m adhesive bonded to the webs 16 and 17 of an extruded aluminium profile framework 18 which is of such dimensions that the sheets 14 and 15 are supported approximately 2 cm apart. The sheets 14 and 15 are bonded to the framework 18 during assembly such that they are supported in a taut condition when no evacuation or inflation is applied. The inner surfaces of the sheets 14 and 15 are coated with a thin layer of a silicone oil. Panel 13 is of similar construction to panel 12.

The glazing bar 11 has a hollow main section 20 which is of rectangular cross-section from which a plurality of limbs extend. A slot 21 defined by the webs 22 and 23 is shaped to receive and locate the head of one or more screw-threaded bolts (not illustrated in FIGS. 5 and 6) by which the glazing bar 11 and the panels 12 and 13 may be affixed to a load-bearing support of a growing house.

Flanges 24 and 25 are shaped to accommodate and engage the beads 26 and 27 of the aluminium profile framework 18 thereby serving to locate and attach the panels 12 and 13 to the glazing bar 11 when the structure is assembled as illustrated in FIG. 6.

The glazing bar 11 includes two fastening flanges 29 and 30 which function to engage a closure beading 31 comprising an extruded profile of a vinyl chloride polymer having an undeformed shape and configuration as illustrated in FIG. 6 and being flexible in the bridging portion 32 to enable it to be deformed and "snapped" over the fastening flanges 29 and 30. To facilitate the deformation of the closure beading 31 and its location over the fastening flanges 29 and 30 it may be held in the deformed state by engaging the slots 34 and 35 with a suitable tool (not illustrated in FIGS. 5 and 6). Fastening surfaces 36 and 37, and 38 and 39 of the closure beading 31 (see FIG. 6) are adapted to engage the flanges 29 and 30 and beads 26 and 27 of the aluminium profile framework 18 thereby securely fastening the panels to the glazing bar 11.

A locking strip 40 comprising an extruded profile of a vinyl chloride polymer is located in a channel 41 of the closure beading 31 and retained therein by the interengagement of ridges 42 in the locking strip 40 with corresponding grooves in the wall of the channels 41. The locking strip 40, located as illustrated in FIG. 6 in the assembled structure, prevents the closure beading 31 separating from the fastening flanges 29 and 30 of the glazing bar 11 and hence prevents the panels from separating from the glazing bar 11.

The hollow main section 20 of the glazing bar 11 serves as a connection between the glazing panels 12 and 13 and a pump 45 which is of conventional construction and is therefore not illustrated in detail and has a valve which is controllable to either evacuate or inflate the glazing panels 12 and 13. The communication between the glazing panels 12 and 13 is illustrated in FIG. 6 (but not in FIG. 5 for simplicity of illustration) and comprises an aperture 46 in the wall of the glazing bar 11 and a corresponding aperture 47 in framework 18 of the panel. An air-tight seal between the panel and the glazing bar 11 is obtained by means of a rubber grommet 48 having a central bore 49 which is located between the panel and the glazing bar 11 during the assembly of the structure.

Figure 7:
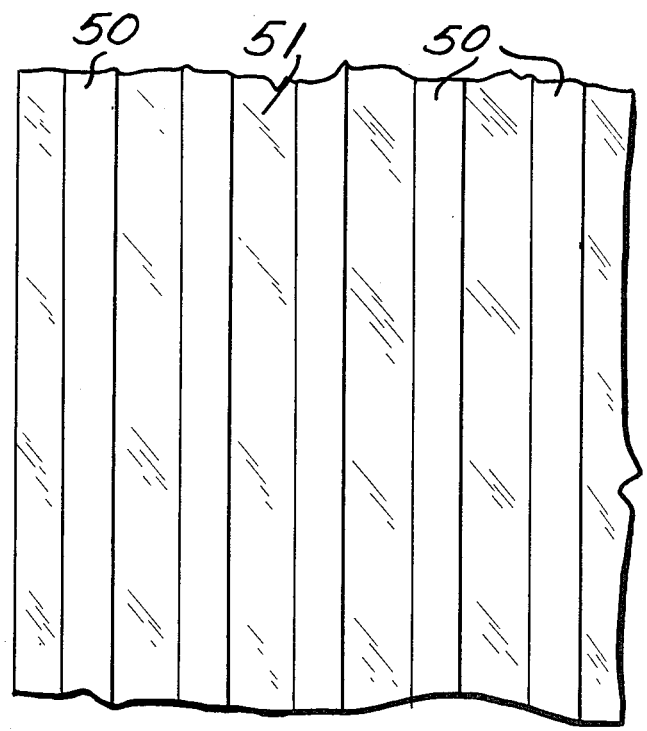
FIG. 7 is an enlarged partial plan view of another embodiment of a panel according to the invention.

FIG. 7 illustrates schematically a shutter pattern which may be applied to each of the sheets of film of the double-glazing structure according to the invention to control the intensity of solar radiation transmitted into a growing house. In this embodiment each sheet of film 51 has disposed thereon a set of parallel bands 50 of solar radiation absorbing material, the bands 50 applied to the film surfaces 51 such that they are in a staggered relationship to each other when the enclosure is neither inflated nor evacuated. Complete or partial inflation or evacuation of the panel enclosure results in a relative movement of the two sheets of film and hence the shutter patterns apply to them.

The improvement in light transmission which can be achieved by evacuating a double-glazing panel according to the invention is demonstrated by the following Total Luminous Transmittance figures, measured by ASTM test D-1003-61:

| Structure assessed | Total luminous transmittance |
| --- | --- |
| Single layer of 125 μm transparent polyethylene terephthalate film as used in sheets 2 and 3 in drawing. | 87% |
| Panel illustrated in FIG. 2. | 75% |
| Evacuated panel illustrated in FIG. 4. | 86% |

I claim:

1. A double-glazing panel assembly comprising: means for defining a framework, said framework means circumferentially delineating at least one interior area;

two uniformly light-transmitting, flexible thermoplastics films disposed across said interior area;

means for attaching said flexible films to said framework means in a spaced apart relationship so that said framework means and said flexible films form a substantially gas-impermeable enclosure containing a transparent gas; and means for selectively evacuating and inflating said enclosure, the arrangement being such that, upon evacuation of said enclosure, the inner surfaces of said flexible films are caused to be substantially united in surface-to-surface contact to permit light to pass through the films while minimizing the light-scattering effect of said inner surfaces upon light-scattering effect of said surfaces upon light passing through said interior area and such that, upon inflation, said panel assembly provides thermal insulation over said interior area while permitting a maximum amount of light to pass through the films.

2. A double-glazing assembly according to claim 1 wherein said inner surfaces of said flexible films are treated with means for further reducing the reflection or scattering of light at said surfaces.

3. A double-glazing assembly according to claim 2 wherein said reducing means is a thin layer of liquid directly on said inner surfaces of said flexible films.

4. A double-glazing assembly according to claim 1 wherein said evacuating and inflating means includes a passage through said framework means of said panel assembly.

5. A double-glazing assembly according to claim 1 including a glazing bar having a conduit connecting the enclosure of the panel to said evacuating means.

6. A double-glazing assembly according to claim 1 wherein said thermoplastic film is a linear polyester film.

7. A method of avoiding undesirable effects of light scattering and reflection in a double-glazing panel assembly including a framework delineating an interior area with two uniformly light-transmitting flexible thermoplastics films disposed across the interior area, spaced apart and defining with the framework a substantially gas-impermeable enclosure, comprising the steps of:

sequentially inflating and evacuating the enclosure defined by the flexible films and framework with transparent gas from between the flexible films so that the flexible films are caused to be substantially united in surface-to-surface contact upon evacuation to minimize the light-scattering effect of the inner surfaces upon light passing through the interior area.

* * * * *